(12) United States Patent
Kenyon et al.

(10) Patent No.: US 10,433,154 B2
(45) Date of Patent: Oct. 1, 2019

(54) ATTRIBUTE INDICATING A HOME COMPONENT OF A SUBSCRIBER

(71) Applicant: Hewlett Packard Enterprise Development LP, Houston, TX (US)

(72) Inventors: Bradley Kenyon, Omaha, NE (US); Tiffany A. Moore, Omaha, NE (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/719,019

(22) Filed: Sep. 28, 2017

(65) Prior Publication Data

US 2019/0098485 A1 Mar. 28, 2019

(51) Int. Cl.

| | |
|---|---|
| H04W 8/00 | (2009.01) |
| H04W 8/04 | (2009.01) |
| H04W 4/12 | (2009.01) |
| H04L 12/58 | (2006.01) |
| H04B 7/0413 | (2017.01) |
| H04B 7/06 | (2006.01) |
| H04W 8/18 | (2009.01) |
| H04W 60/00 | (2009.01) |

(52) U.S. Cl.
CPC ............ *H04W 8/04* (2013.01); *H04B 7/0413* (2013.01); *H04B 7/0619* (2013.01); *H04L 51/14* (2013.01); *H04W 4/12* (2013.01); *H04W 8/18* (2013.01); *H04W 60/00* (2013.01); *Y02D 70/1262* (2018.01)

(58) Field of Classification Search
CPC ............ H04L 65/1016; H04L 65/1073; H04L 61/6054; H04L 65/1006; H04W 8/04; H04W 60/00; H04W 88/16; H04W 8/02; H04W 4/02; H04W 8/06; H04W 12/06; H04W 88/184; H04W 8/08; H04W 36/0005; H04W 4/06
USPC ....... 455/466, 433, 435.1, 414.1, 432.1, 411, 455/412.2, 426.1, 445, 405, 412.1, 425, 455/432.3
See application file for complete search history.

(56) References Cited

U.S. PATENT DOCUMENTS

| | | | |
|---|---|---|---|
| 5,881,235 A * | 3/1999 | Mills ................. | H04W 8/245 455/418 |
| 6,622,016 B1 * | 9/2003 | Sladek ................ | H04Q 3/0054 455/414.1 |
| 6,707,901 B1 | 3/2004 | Hodges et al. | |
| 7,031,707 B1 | 4/2006 | Rune et al. | |
| 8,055,774 B2 | 11/2011 | Kaura et al. | |
| 8,130,745 B2 | 3/2012 | Hua et al. | |

(Continued)

*Primary Examiner* — Fred A Casca
(74) *Attorney, Agent, or Firm* — Hewlett Packard Enterprise Patent Department (57) ABSTRACT

Examples herein redirect a message intended for a subscriber from a non-registered component to a home component. Examples disclose receiving, by the non-registered component, a message intended for the subscriber. The non-registered component is a component at which the subscriber did not register to gain network access. The non-registered component processes a data attribute within a profile corresponding to that subscriber. The data attribute indicates a home component at which the subscriber is registered to gain network access. The non-registered component redirects the message intended for the subscriber to the home component based on the data attribute.

16 Claims, 6 Drawing Sheets

(56) References Cited

U.S. PATENT DOCUMENTS

| | | |
|---|---|---|
| 8,150,394 B2 | 4/2012 | Bianconi et al. |
| 9,001,730 B2 | 4/2015 | Noldus et al. |
| 9,509,811 B2 | 11/2016 | Vazquez et al. |
| 2005/0041640 A1* | 2/2005 | Nasielski ............... H04W 68/00 370/352 |
| 2006/0002400 A1 | 1/2006 | Kenyon et al. |
| 2010/0290456 A1* | 11/2010 | Mutikainen ....... H04L 29/12103 370/352 |
| 2012/0020347 A1 | 1/2012 | De Vega De La Red |
| 2012/0257546 A1* | 10/2012 | Castleberry ........... H04W 76/12 370/259 |
| 2013/0034055 A1 | 2/2013 | Nenner et al. |
| 2013/0155920 A1* | 6/2013 | Lim ........................ H04W 4/70 370/310 |
| 2015/0304836 A1* | 10/2015 | Anslot .................... H04W 8/06 455/411 |
| 2015/0312387 A1* | 10/2015 | Merino Vazquez ......................... H04L 65/1016 370/216 |

* cited by examiner

ATTRIBUTE INDICATING A HOME COMPONENT OF A SUBSCRIBER

BACKGROUND

Wireless communication networks have increased in popularity with the advent of wireless devices, such as smartphones, mobile devices, etc. Such wireless communication networks provide both data and voice communications. Accordingly, a subscriber may refer to a wireless device that has an account with a communication service provider (CSP). Each subscriber is associated with a profile definition, referred to as the profile data that includes both transient data and static data. Transient data includes, by way of example, which domain and/or respective networking component the mobile device is attached to, locations of the mobile device, time of attachment, etc. Static data includes, by way of example, charging characteristics, policies for network access, provided services, etc.

BRIEF DESCRIPTION OF THE DRAWINGS

In the accompanying drawings, like numerals refer to like components or blocks. The following detailed description references the drawings, wherein.

DETAILED DESCRIPTION

Profile data corresponding to the subscriber data may be accessed by service components to authenticate, attach, and register that mobile device within a CSP domain to provide communication services. During attachment, the particular subscriber is granted services within the network. Based on a successful attachment, that mobile device is registered to a home component in the network. Registration is the process of validating the subscriber, authenticating the subscriber, and sharing the profile data of that subscriber within the network. Registration may also update the subscriber profile data with the transient information related to the subscriber's location and status within the network. During registration, the subscriber is registered via a specific component, referred to as a home component within the network. The home component stores the permanent subscriber data and transient network location(s) of the subscriber.

Data integrity issues may arise when the registered profile data is not synchronized amongst similar components within the network in a timely manner. This may lead to an inaccurate depiction of the subscriber registration status within the network which may cause the ongoing services for that subscriber to get dropped and/or severely impacted. For example, in a communications network, such as 2G, 3G, 4G, 5G, LTE, etc., the home component at which a subscriber is authenticated and registered to gain network access may not provide updates of the transient profile data in a timely manner to the other components in the network. In this example, a non-registered component may not have access to the most recent updates of the transient profile data and may be using conflicting data to send messages. This results in a race condition in which two updates at different components may be in conflict with each other, and the most recent update is pushed for synchronization while the former update may be disregarded.

Accordingly, the present disclosure provides a mechanism that allows messages to be redirected to a home component, such as a home subscriber server, in which the subscriber registers to gain network access. Rather than using the synchronized profile data among the components within the network, the disclosure redirects messages to the home components with the fully updated subscriber profile data. Redirecting messages to the home component prevents the race condition that produces the conflicting data. This idea ensures the subscriber receives ongoing services without impact.

The disclosure also provides the addition of a data attribute associated with a data profile that indicates the home component of the particular subscriber. The data attribute may be provided as part of the profile data or as a subset of data from the profile data. Using the data as a subset means less information may be maintained and referenced at each of the components within the network.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "multiple," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on. As such, these terms may be used interchangeably throughout.

The foregoing disclosure describes a number of example implementations for using a data attribute to redirect messages to a home component of a subscriber. The disclosed examples may include systems, devices, computer-readable storage media, and methods for redirecting messages to the subscriber appropriately. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. For example, FIGS. 1-6 may illustrate a wired connection; however, this was done for illustration purposes as it may be understood the wired connection may comprise a wireless connection or combination thereof.

Figure 1:
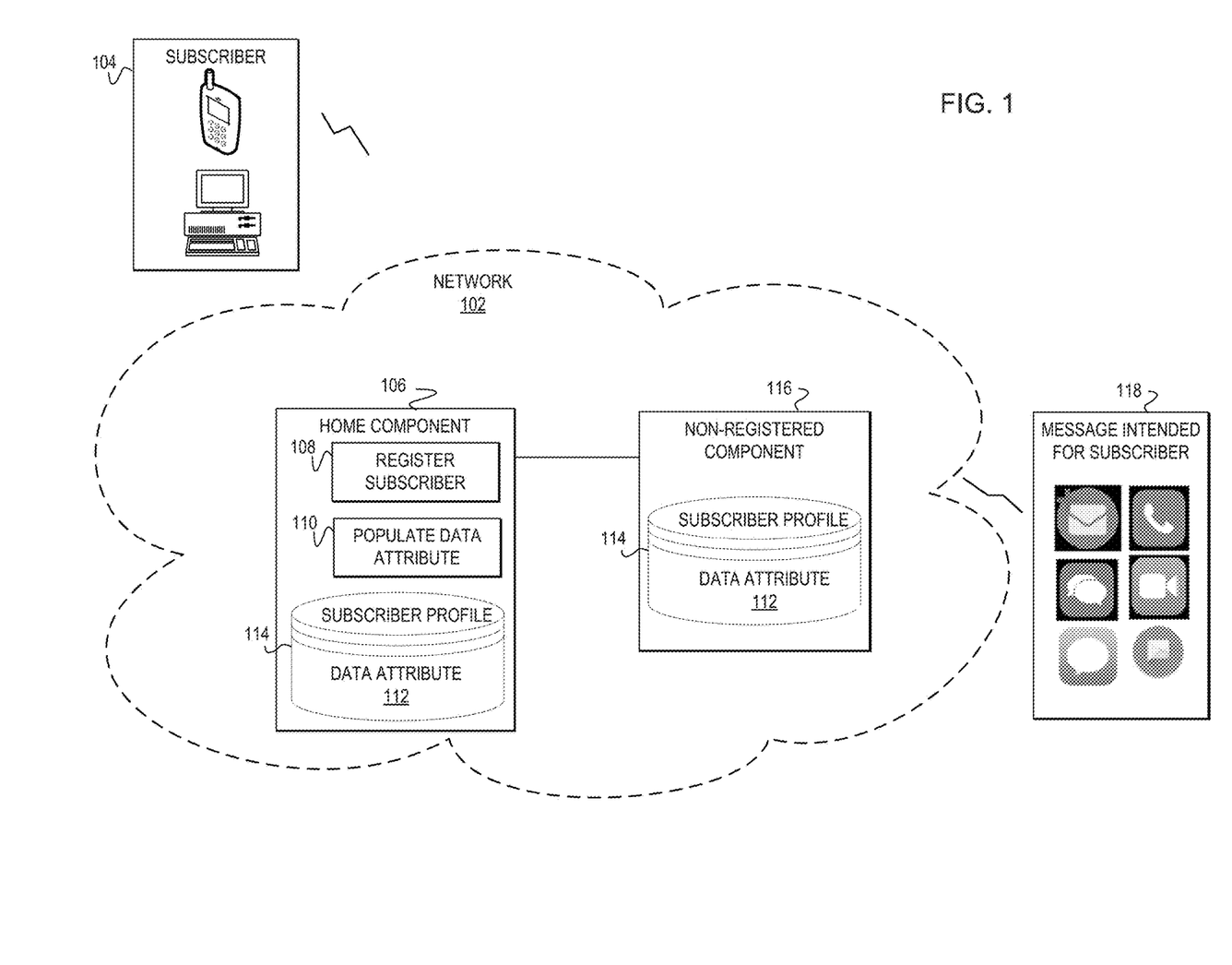
FIG. 1 is an example communications network including a subscriber to register at a home component and populate a data attribute in accordance with the present disclosure.

FIG. 1 illustrates an example communications network 102 including subscriber 104 to register at home component 106. Based on the registration, home component 106 proceeds to populate data attribute 112. Data attribute 112 lists home component 106 at which subscriber 104 registers. As such, data attribute 112 identifies home component 106 among the other components in network 102 and corresponds to subscriber profile 114. In response to the populated data attribute 112, home component 106 transmits data attribute 112 to the other components, such as non-registered component 116. In turn, non-registered component uses data attribute 112 to redirect message 118 intended for subscriber to home component 106. Redirecting message(s) 118 to home component 106, prevents conflicting subscriber profile updates and ensures the most up to date profile information is used to continue services for subscriber 102. In examples, subscriber 104 may change locations and to ensure services follow subscriber 104, the transient profile data is updated at home component 106. Using data attribute 112 to redirect message(s) 118 to home component 106 minimizes impacts such that network 102 services continue seamless with minimal impact.

Communications network 102 as in FIG. 1, represents a wired and/or wireless telecommunications system that provide network access, data services, and/or voice services for subscriber 104. Implementations of communications network 102 include at least one or combination of 2G, 3G, 4G, 5G, Long Term Evolution (LTE) network, Software Defined Network (SDN), Internet Protocol Multimedia System (IMS), virtual network, Evolved Packet System (EPS), Global System for Mobile Communications (GSM), or other type of communications system capable of providing network access, data services, and voice services to subscriber 104. Although FIG. 1 illustrates communications network 102 as including home component 104, non-registered component 116, and subscriber profile 114, implementations should not be limited as communications network 102 may also include a regional service area, home subscriber server (HSS), gateway, switch, data center, router, wireless access point, base station, etc.

Subscriber 104 represents the various devices capable of providing network access, data communications, and/or voice communications within network 102. Subscriber 104 may initiate a process in which to attach to network 102. Based on a successful attachment, home component 104 may in turn authenticate and register subscriber 104 to network 102 at module 108. Registration of subscriber 104 includes updating the subscriber profile with the transient information related to location and/or status of subscriber 104. Additionally, during registration, home component 104 stores the static profile data and transient profile data of subscriber 104. Although subscriber 104 is represented by a mobile device and/or computing device, this was done for illustrations purposes and not intended to limit implementations of the present disclosure. For example, subscriber 104 may also include a laptop, wireless device, or another machine type of communication device capable of providing communication services within network 102.

Home component 106 is a communications component within network 102 that registers subscriber 104 to gain access and services to network 102. Home component 106 registers subscriber at module 108 and in response to a successful registration, home component 110 may populate data attribute 112 at module 110. Home component 106 is considered the component within network 102 at which subscriber 104 is storing permanent subscriber data. During registration, subscriber 104 is authenticated so that subscriber 104 may receive calls, data, etc. In this regard, enabling services (e.g., calls, data) means the registration was successful. In an unsuccessful registration, subscriber 104 may be denied access to network 102 and/or services. In one implementation, subscriber 104 may be registered to single communications component within network 102, meaning the other communications components are considered non-registered component(s) 116 that do not have the current registration of subscriber 104. In this implementation, home component 104 is the component in the network that stores the permanent or static subscriber data. In a specific implementation, home component 106 includes a home subscriber server (HSS) that includes a master subscriber repository used to support the various communication networks (e.g., 4G, 5G, LTE) in handling the different communication services. In this implementation, the HSS includes the master repository that includes subscribers located within communications network 102 to support communication services, such as handling calls and sessions. As such, the HSS may communicate with other component servers in network 102 to transmit subscriber profiles. As these other component servers, the subscriber profiles are used to track subscriber 104 to continue services within network 102. In other implementations, home component 106 includes various communication components such as a gateway, authentication authorization and account (AAA) server, mobile management entity (MME), home location registry (HLR), general packet radio service support node (SGSN), enhanced packet data gateway (ePDG), service centralization and continuity application server (SCC-AS), or other type of communications component responsible for registering and maintaining subscriber 104 profile data.

At modules 108-110 home component 106 registers subscriber 104 and based on the registration, proceeds to populate data attribute 112. Registration at module 108 includes the process of validating subscriber 104 to network 102, storing the permanent or static profile data, and updating the transient profile data. As such, the process may include authenticating and sharing subscriber profile 114 including transient information related to the subscriber's location and status with the other component(s) (e.g., non-registered component 116) in network 102. As mentioned above, successful registration is completed when subscriber 104 is authenticated and at least profile information is shared with the other component(s). In response to the successful registration, home component 106 populates data attribute 112 at module 110. Populating the data attribute at module 110 may include enabling a value to indicate the functionality. In one implementation if data attribute 112 is absent, the address of home component 106 is provided as data attribute 112. In another implementation, in response to a previously populated data attribute, home component 106 proceeds to update the address or location to currently registered home component 106. In these implementations, home component 106 transmits data attribute 112 to the other component(s) for redirection of messages to home component 106. Implementations of modules 108-110 may include, by way of example, instructions (e.g., stored on a machine-readable medium) that, when executed (e.g., by the home component 106), implement the functionality of modules 108-110. Alternatively, or in addition, modules 108-110 may include electronic circuitry (i.e., hardware) that implements the functionality of modules 108-110.

Data attribute 112 may be populated by home component 106 in response to the registration of subscriber 104. Data attribute 112 represents home component 106 among the other components (e.g., non-registered component 116) at which subscriber 104 has registered. In response to the population of data attribute 112, home component 106 transmits at least the populated data attribute to the other components in network 102. Non-registered component 116 in turn receives data attribute 112 and maintains as part of subscriber profile 114. Non-registered component 116 may use data attribute 112 to redirect message(s) 118 to home component 106 at which subscriber permanent data is stored. As such, data attribute 112 may include an address, location, or other identifying value that allows the other components to redirect message(s) 118 to home component 106. In implementations, data attribute 112 may be included in an overall data profile, including both static and transient information, corresponding to subscriber 104. In other implementations, data attribute 112 may include a subset of the overall profile data maintained at each of the other components. As such, data attribute 112 may be enabled and maintained as part of subscriber profile 114.

Non-registered component 116 are considered the other component(s) within network 102, at which subscriber 104 is not registered. Since during registration, home component 104 stores the static profile data and updates the transient profile data, this means non-registered component 116 may not have the most recent profile data as subscriber profile 114. Non-registered component 116 may be the same type of communications component as home component 106 or may include a different type of communications component. For example, non-registered component 116 and home component 106 may both include an HSS, while in another example, non-registered component 116 may include a gateway while home component 106 includes the HSS. Implementations of non-registered component 116 may include gateway, authentication authorization and account (AAA) server, mobile management entity (MME), home location registry (HLR), general packet radio service support node (SGSN), enhanced packet data gateway (ePDG), service centralization and continuity application server (SCC-AS), or other type of communications component responsible for receiving message(s) 118 and redirecting to home component 106 according to data attribute 112.

Message(s) 118 represent data that is intended for subscriber 104. Examples of these message(s) 118 as illustrated in FIG. 1 may include email, text messages, video, phone call, images, etc. These message(s) 118 are directed to subscriber 104 and using subscriber profile 114, components that receive message(s) 118 may transmit to home component 106 at which subscriber 104 is registered so home component 106 may transmit message(s) to the correct location of subscriber 104.

Figure 2:
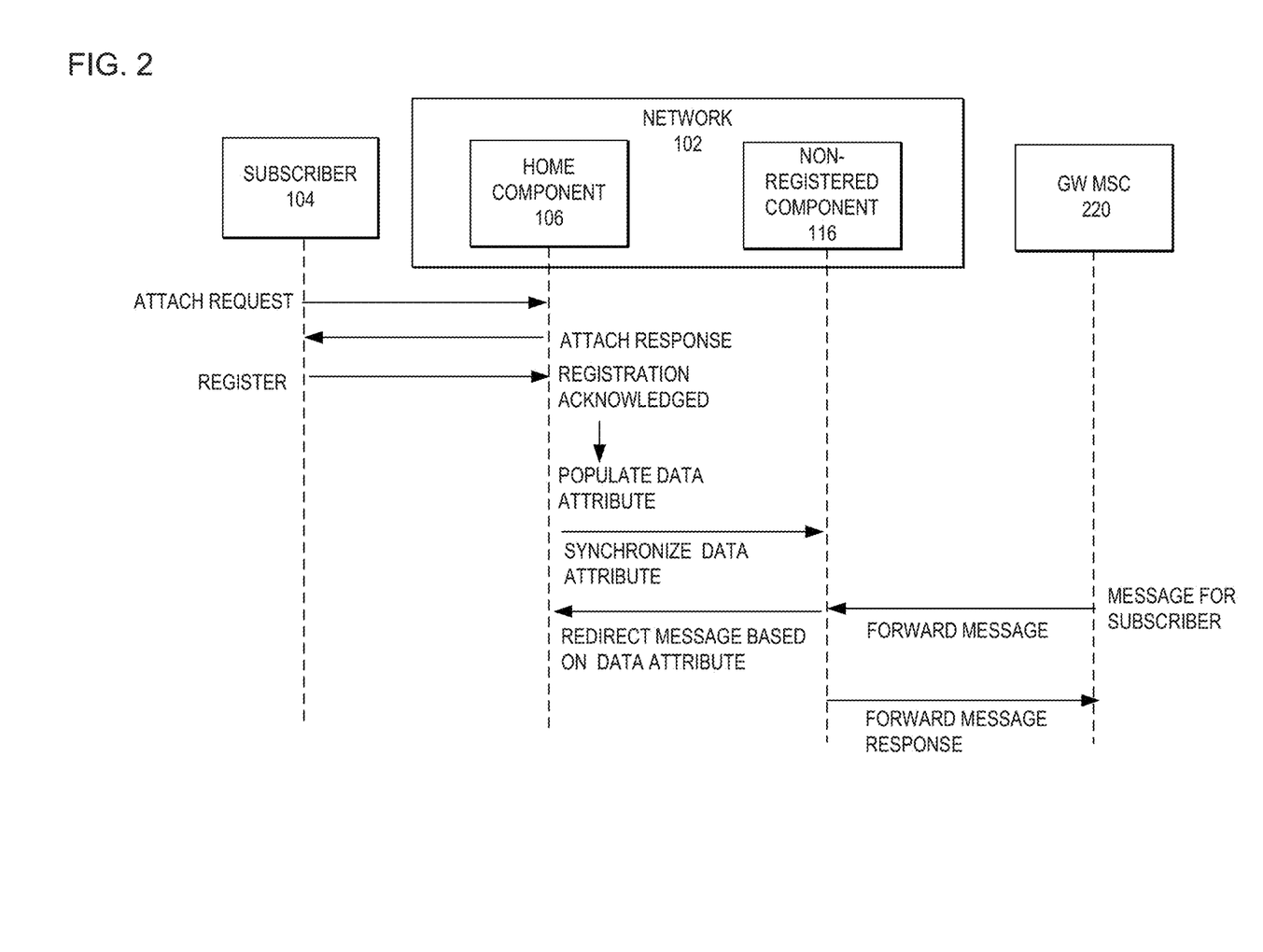
FIG. 2 illustrates an example communications diagram between a subscriber, home component, and non-registered component to populate a data attribute and redirect messages according to the data attribute in accordance with the present disclosure.

FIG. 2 illustrates an example communications diagram between subscriber 104 and various components 106 and 116 in network 102 and gateway mobile switching center (GW MSC) 220. Initially, subscriber 104 requests attachment to network 102. In turn, network 102 responds with an attachment response. In turn, subscriber 104 proceeds to register to home component 106 within network 102. The home component 106 acknowledges the registration and proceeds to register subscriber 104 to that home component 104. Based on the successful registration, home component 106 proceeds to populate the data attribute within the subscriber profile. From the data attribute, home component 106 may proceed to synchronize the data attribute among the other components, such as non-registered component 116 in network 102. In this example, the data attribute is applicable to those communication components storing the permanent subscriber profile data, such as the HSS and not applicable to components such as the MME or SGSN. Synchronizing the data attribute among the subscriber profiles among the components 106 and 116 in network 102 allows the other components that receive messages for the subscribers to redirect to the registered component that includes the accurate profile information, such as the subscriber location.

GW MSC 220 initially receives a message intended for the subscriber and in turn, forwards the message to non-registered component 116. GW MSC 220 is a switching center located within network 102 or externally to network 102 that may receive messages intended for the various subscribers.

Another subscriber may choose to terminate a call or send a text to subscriber 104. In this manner, GW MSC 220 initially receives the message and forwards onto non-registered component 116. Non-registered component 116 retrieves the synchronized data attribute to identify which component is the home component for subscriber 104. Using the retrieved data attribute, non-registered component 116 redirects the message to home component 106 and transmits the forward message response back to GW MSC 220. Redirecting messages to the components that have registered the subscribers prevents conflicting information that may cause the message to be dropped and/or discarded.

Figure 3:
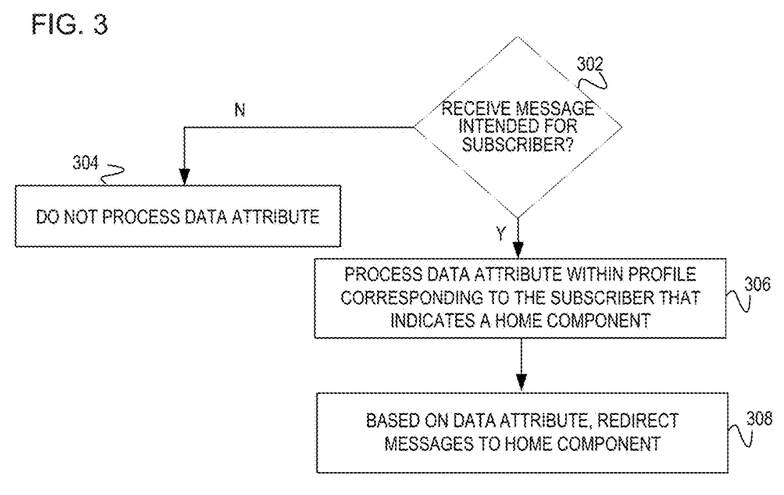
FIG. 3 illustrates an example flow diagram to redirect messages intended for a subscriber from a non-registered component to a home component in which a subscriber is registered in accordance with the present disclosure.
Figure 4:
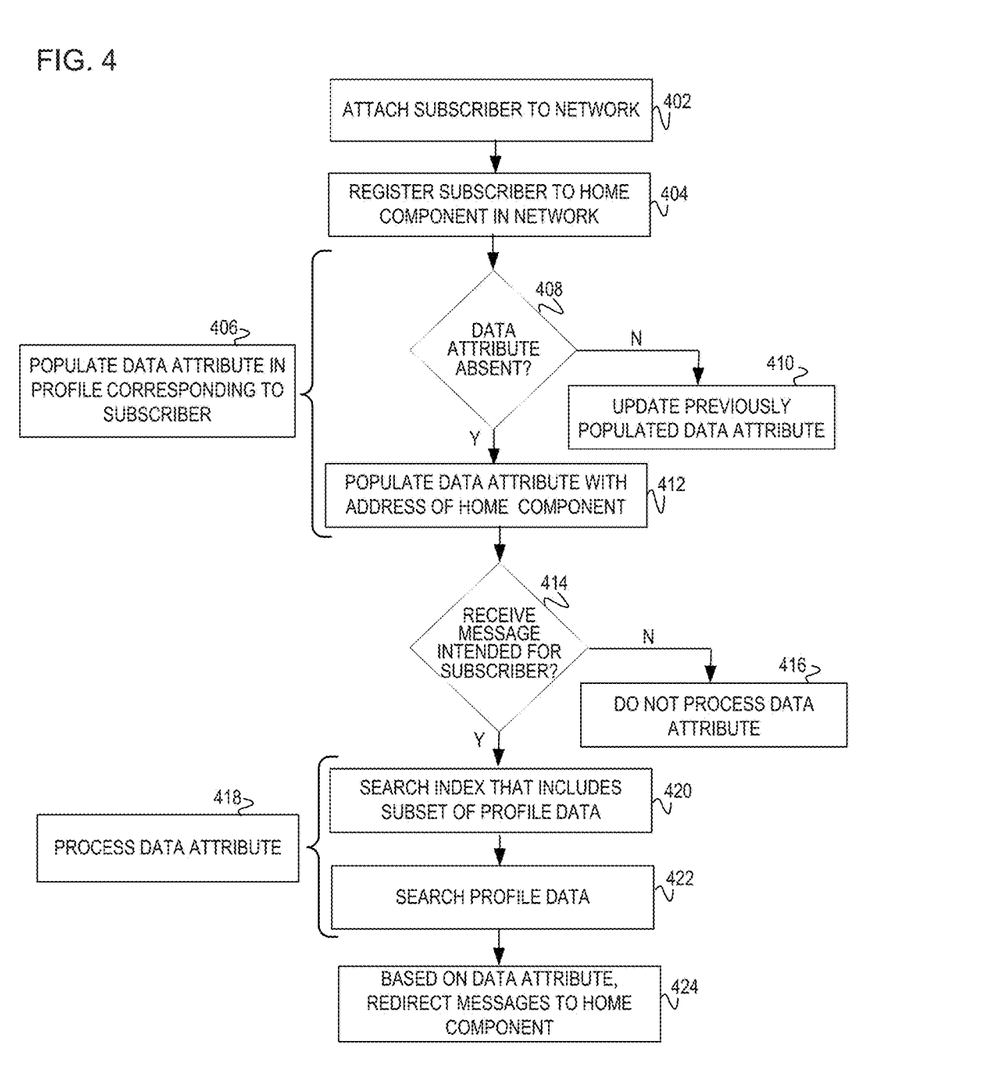
FIG. 4 illustrates an example flow diagram to populate, within a profile corresponding to a subscriber, a data attribute that indicates a home component in which the subscriber is registered in in accordance with the present disclosure.

Referring now to FIGS. 3 and 4, flow diagrams are illustrated in accordance with various examples of the present disclosure. The flow diagrams represent processes that may be utilized in conjunction with various systems and devices as discussed with reference to the preceding figures. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 3-4 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 3 is a flow diagram illustrating a method executable by a communication component to redirect a message intended for a subscriber to a home component that has currently registered the subscriber. The communication component receives the message intended for the subscriber and in turn processes a data attribute within a profile corresponding to the subscriber. The data attribute enables a functionality to the communication component that configures a redirection of the message to the home component. In discussing FIG. 3, references may be made to the components in FIGS. 1-2 to provide contextual examples. In one implementation, the communication component operates in conjunction with a non-registered component 116 as in FIG. 1 to execute operations 302-308 to redirect the message to the home component. In another implementation, communication component operates in conjunction with home component 106 to execute operations 302-308. Although FIG. 3 is described as implemented by the communication component, it may be executable on other suitable hardware components. For example, FIG. 3 may be implemented in the form of executable instructions on a machine-readable storage medium 504 and 604 as in FIGS. 5-6. In another implementation, the network controller provides management functionality within an HSS.

At operation 302, the communication component coupled to the non-registered component receives a message intended for the subscriber. The non-registered component is considered the component within the network at which the subscriber has not registered to gain network access. As such, based on the successful registration at the home component, the populated data attribute is transmitted to the appropriate components within the network. The populated data attribute indicates which component has registered the subscriber within the network. This ensures the most accurate and up-to-date information transient information is used with regards to the subscriber. In another implementation, the subscriber is attached and authenticated to the network prior to registration. Based on a successful registration at the home component, the subscriber is authenticated for network access and services thereof. This implementation is described in a later figure. Based on an unsuccessful registration, the subscriber does not gain network access and may be left without services associated with the network. In response to receiving the message by the non-registered component, the non-registered component may proceed to operation 306 and process the data attribute transmitted by the home component. Otherwise, the non-registered component may proceed to operation 304.

At operation 304 in response to the non-receipt of the message, the non-registered component does not process the populated data attribute. This may indicate that the subscriber has not yet been registered to the home component and as such, the home component may have yet to transmit the populated data attribute. In another implementation, the non-registered controller may continue to monitor for incoming messages intended for the subscriber.

At operation 306 based on the receipt of the message intended for the subscriber, the non-registered component processes the data attribute. The data attribute may be retrieved from a subset of the profile or from the overall data profile that corresponds to that subscriber. Retrieving the data attribute from the subset, the data attribute may be listed in an index or structured storage that includes subsets of profile information, each corresponding to a different subscriber. In this implementation, the non-registered component looks for the data attribute that provides the location to the home component for that specific subscriber. Retrieving the data attribute from the overall profile data, the non-registered component may maintain the full data profile including both static and transient data for that subscriber. As such, the non-registered component performs a lookup function to retrieve the data attribute for that subscriber. The data attribute may include an address of the home component so that the non-registered component may redirect messages intended for the subscriber to that home component that has registered that particular subscriber as at operation 308.

At operation 308 based on the retrieved data attribute, the non-registered component proceeds to redirect the message to the home component at which the subscriber is currently registered. Redirecting the message may include transmitting the message to the home component to ensure the accurate profile information such as the subscriber location such that the services provided to the subscriber continue seamlessly and without impact. In other implementation, the transmission of the message includes routing the message traffic to the home component for delivery to the subscriber.

FIG. 4 is a flow diagram illustrating a method executable by a communication component to populate a data attribute so that other components that receive a message intended for a subscriber is redirect to a home component. A subscriber is registered at a home component. In response to the registration of the subscriber, the communication component populates a data attribute. In response to the populated data attribute, the home component transmits this attribute to the other components in the network. The other components including the non-registered component maintains a repository of the data attribute that corresponds to the various subscribers. Thus upon a non-registered component intended for a specific subscriber, the non-registered component retrieves the data attribute to redirect the message to that home component that has registered the subscriber. In discussing FIG. 4, references may be made to the components in FIGS. 1-2 to provide contextual examples. In one implementation, the communication component operates in conjunction with a non-registered component 116 as in FIG. 1 to execute operations 402-424 to redirect the message to the home component. In another implementation, communication component operates in conjunction with home component 106 to execute operations 402-424. Although FIG. 4 is described as implemented by the communication component, it may be executable on other suitable hardware components. For example, FIG. 4 may be implemented in the form of executable instructions on a machine-readable storage medium 504 and 604 as in FIGS. 5-6. In another implementation, the network controller provides management functionality within an HSS.

At operation 402, the subscriber is attached to the network. During attachment, the subscriber requests access to the network. Based on attachment, the communications component proceeds to register the subscriber as at operation 404.

At operation 404, the home component registers the subscriber. During registration, the subscriber is registered to that specific component among the other components within the network. That specific component is referred to as the home component. As such, the component may authenticate the subscriber to the network so that subscriber may receive and request calls, data, etc. Based on a successful registration which means the subscriber has been authorized to the network to perform and receive services, the home component proceeds to populate the data attribute at operation 406. Additionally, during registration, the home component stores the permanent subscriber profile data such as the static profile data and may update the transient profile data include the subscriber location and/or status.

At operation 406, the home component proceeds to populate the data attribute. The home component 406 may read the data attribute associated with the profile of that subscriber. In response to the data attribute being absent, the home component enables the functionality of the data attribute and populates with a value that is used to identify the home component. The value may include an address and/or location. In response to the data attribute being previously populated with a different home component, the home component updates the data attribute to the current home component. Operation 406 may include transmitting the populated data attribute to other components in the network so when the other components receive the message intended for the subscriber, those other components use the data attribute to redirect to the home component.

At operation 408, the home component determines whether the data attribute is absent. Based on the registration, the home component reviews the subscriber profile in which the data attribute would be present. The home component may retrieve the profile data that includes both the static and transient information that corresponds to the subscriber. In addition to the profile data, the data attribute may be enabled indicating the functionality of the registration of the home component.

At operation 410 in response to the home component determining that the data attribute is absent, the home component populates the data attribute with the value that identifies the home component. The home component may proceed to add the data attribute as part of the data profile that indicates the address and/or location of the home component.

At operation 412 in response to the data attribute being previously populated, the home component updates the data attribute to the currently registered home component. This includes updating the address and/or location to that home component at which the subscriber is registered. Based on the data attribute being populated, the home component transmits the data attribute to the other components in the network, including the non-registered component. This allows the non-registered component to receive messages intended for the subscriber and redirect to the home component as at operations 414-424.

At operation 414, the non-registered component receives the message that is intended for the subscriber. This may include a call termination, call handling, text message, voicemail, data packet, etc. In one implementation, the non-registered component may proceed to process the data attribute corresponding to the subscriber for redirecting the message to the home component where the subscriber registered. Operation 414 may be similar in functionality to operation 302 as in FIG. 3.

At operation 416 in response to the non-registered component not receiving the message, the non-registered component does not proceed to process the data attribute. As such, the non-registered component may continue to monitor for messages. Operation 416 may be similar in functionality to operation 304 as in FIG. 3.

At operation 418, the non-registered component proceeds to process the data attribute for that subscriber in which the received message is intended. In implementations, processing the data attribute may include retrieving the data attribute for that subscriber form a subset of the profile information or from the full data profile as at operations 420-422. The non-registered component may retrieve the data attribute from a subscriber repository which includes the different subscribers and the registered home components to each of the different subscribers. Operation 418 may be similar in functionality to operation 306 as in FIG. 3.

At operation 424, the non-registered component uses the retrieved data attribute for redirecting the message to the home component at which the subscriber registered. The data attribute identifies the address and/or location of the home component so that the non-registered component uses the address and/or location to redirect the message to the home component. In turn, the home component receives the message from the non-registered component for distribution to the subscriber.

Figure 5:
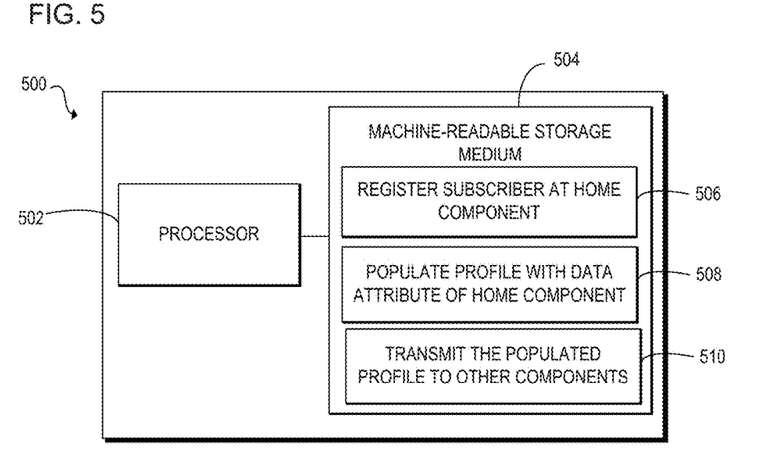
FIG. 5 is a block diagram of an example computing device with a processing resource to execute instructions in a machine-readable storage medium for registering a subscriber and populating a data attribute that indicates a home component of the subscriber and in turn, transmitting the data attribute to other components in accordance with the present disclosure.
Figure 6:
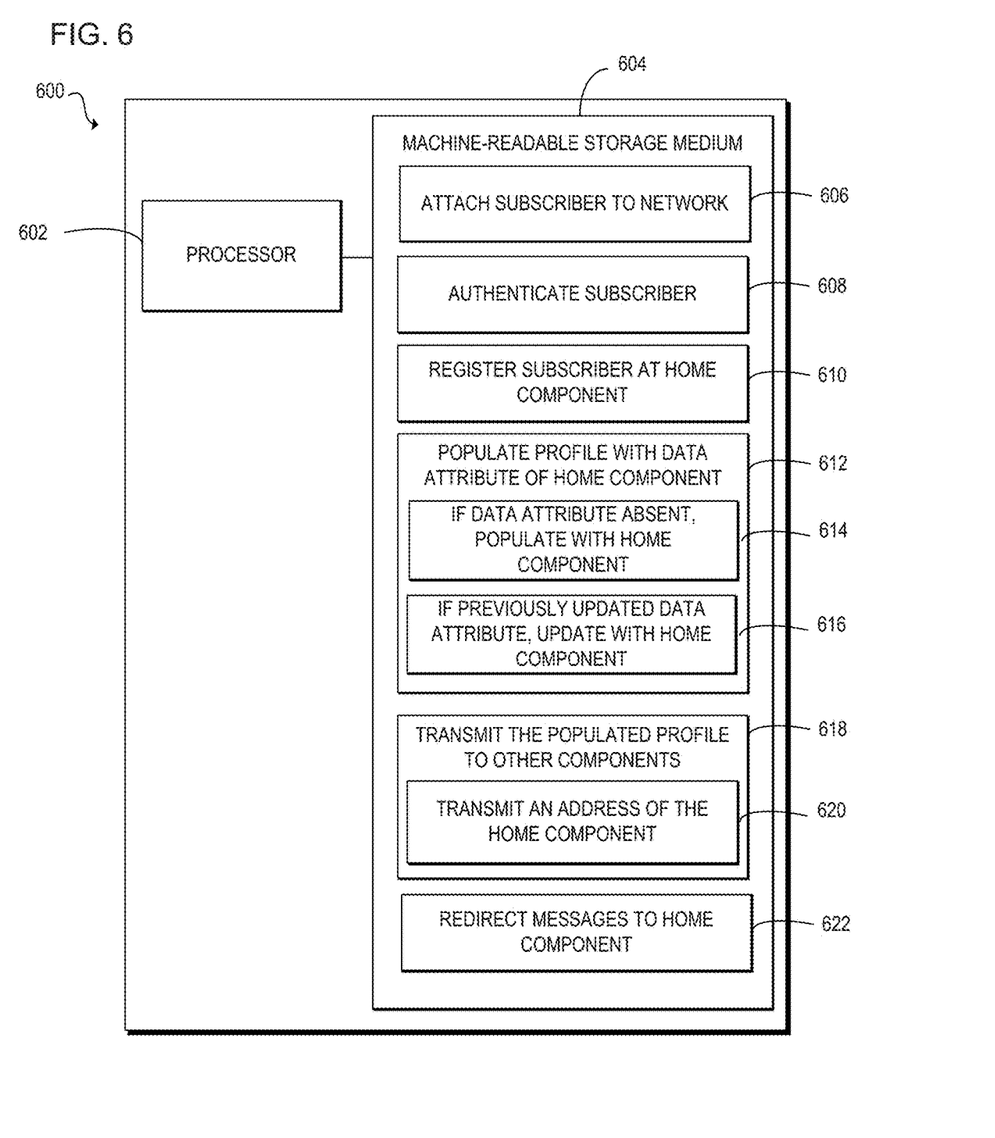
FIG. 6 is a block diagram of an example computing device with a processing resource to execute instructions in a machine-readable storage medium for registering a subscriber to a home component and an in turn, populating a data attribute indicating the home component in accordance with the present disclosure.

Referring now to FIGS. 5-6, example block diagrams of computing devices 500 and 600 with processing resources 502 and 602 are illustrated to execute machine-readable instructions in accordance with various examples of the present disclosure. The machine-readable instructions represent instructions that may be fetched, decoded, and/or executed by respective processing resources 502 and 602. While illustrated in a particular order, these instructions are not intended to be so limited. Rather, it is expressly contemplated that various instructions may occur in different orders and/or simultaneously with other instructions than those illustrated in FIGS. 5-6.

FIG. 5 is a block diagram of computing device 500 with processing resource 502 to execute instructions 506-510 within machine-readable storage medium 504. Although computing device 500 includes processing resource 502 and machine-readable storage medium 504, it may also include other components that would be suitable to one skilled in the art. For example, computing device 500 may include a controller, memory storage, or other suitable type of component. The computing device 500 is an electronic device with processing resource 502 capable of executing instructions 506-510 and as such embodiments of the computing device 500 include a networking component such as a server, HSS, gateway, switch, router, wireless access point (WAP), or other type of networking component. In other examples, the computing device 500 includes a home component that registers the subscriber and as such is capable of executing instructions 506-510. The instructions 506-510 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-510 to populate the data attribute indicating the home component to the subscriber. Specifically, the processing resource 502 executes instructions 506-510 to: register a subscriber at a home component to gain access to a network; based on a successful registration, populate a profile corresponding to the subscriber with a data attribute indicating an address of the home component; and transmit the data attribute to other components within the network such that the other components are able to redirect messages intended for the subscriber to the home component.

The machine-readable storage medium 504 includes instructions 506-510 for the processing resource 502 to fetch, decode, and execute. In another embodiment, the machine-readable storage medium 604 may be an electronic, magnetic, optical, memory, storage, flash-drive, or other physical device that contains or stores executable instructions. Thus, machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 504 may include an application and/or firmware which can be utilized independently and/or in conjunction with processing resource 502 to fetch, decode, and/or execute instructions of machine-readable storage medium 504. The application and/or firmware may be stored on machine-readable storage medium 504 and/or stored on another location of networking device 500.

FIG. 6 is a block diagram of computing device 600 with processing resource 602 to execute instructions 606-622 within machine-readable storage medium 604. Although computing device 600 includes processing resource 602 and machine-readable storage medium 604, it may also include other components that would be suitable to one skilled in the art. For example, computing device 600 may include a controller, memory storage, or other suitable type of component. The computing device 600 is an electronic device with processing resource 602 capable of executing instructions 606-622 and as such embodiments of the computing device 600 include a networking component such as a server, HSS, gateway, switch, router, wireless access point (WAP), or other type of networking component. In other examples, the computing device 600 includes a home component that registers the subscriber and as such is capable of executing instructions 606-622. The instructions 606-622 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-622 to populate the data attribute indicating the home component to the subscriber. Specifically, the processing resource 602 executes instructions 606-622 to: attach a subscriber to a network; authenticate the subscriber to the network to gain network access; register the subscriber to a home component that may include validating the subscriber and updating the profile with the transient information such as the subscriber's location and/or status within the network; based on a successful registration to the home component, populate the profile corresponding to the subscriber with the data attribute that indicates the home component at which the subscriber is registered; in response to the data attribute being absent, enable the data attribute by populating with an address of the home component; in response to the data attribute being previously populated, update the attribute from the previous home component to the address to the current home component; transmit the data attribute to the other components within the network such that the other components are able to redirect messages intended for the subscriber to the home component; transmit the address of the home component to the other components in the network; and redirect the messages intended for the subscriber to the home component.

The machine-readable storage medium 604 includes instructions 606-622 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 604 may include an application and/or firmware which can be utilized independently and/or in conjunction with processing resource 602 to fetch, decode, and/or execute instructions of machine-readable storage medium 604. The application and/or firmware may be stored on machine-readable storage medium 604 and/or stored on another location of networking device 600.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A method, executable by a networking device to redirect messages to a home component, the method comprising:
    receiving, by a non-registered component at which a subscriber did not register to gain network access, a message configured for delivery to the subscriber;
    processing, by the non-registered component, a data attribute, populated by a home component, within a subset of a profile corresponding to the subscriber, that indicates the home component at which the subscriber is registered to gain network access; and
    based on the data attribute, redirecting the message from the non-registered component to the home component;
    attaching the subscriber to the network;
    registering the subscriber at the home component within the network; wherein registering the subscriber at the home component within the network comprises:
    populating the data attribute with an address to the home component;
    wherein processing the data attribute, within the profile corresponding to that subscriber, that indicates the home component comprises:
    in response to an absent data attribute, updating the data attribute, within the profile of the subscriber, indicating the home component of the subscriber.

2. The method of claim 1 wherein processing the data attribute, within the profile corresponding to that subscriber, comprises:
    searching an index including a subset of profile data for the data attribute indicating the home component of the subscriber.

3. The method of claim 1 processing the data attribute, within the profile corresponding to that subscriber, comprises:

searching a profile data that corresponds to that subscriber for the data attribute indicating the home component of the subscriber.

4. The method of claim 1 wherein registering the subscriber to the home component within the network comprises:
authenticating, by the home component, the subscriber to gain the network access.

5. The method of claim 1 wherein the home component includes a home subscriber server (HSS).

6. A system comprising:
a home component within a network to:
register a subscriber for gaining network access;
based on the registration, populate a data attribute within a profile corresponding to the subscriber that indicates an address of the home component;
transmit a subset of the populated data attribute to other components within the network such that the other components are capable of redirecting, to the home component, a message configured for delivery to the subscriber; and
maintain a full version of the profile; and
a non-registered component, at which the subscriber remains unregistered, within the network to:
receive the message;
process the data attribute, within a profile corresponding to the subscriber; and
redirect the message from the non-registered component to the home component;
wherein the home component is configured to attach the subscriber to the network,
register the subscriber at the home component within the network; wherein registering the subscriber at the home component within the network comprises:
populating the data attribute with an address to the home component;
wherein processing the data attribute, comprises:
in response to an absent data attribute, updating the data attribute, within the profile of the subscriber, indicating the home component of the subscriber.

7. The system of claim 6 wherein based on the registration, populate the data attribute within the profile corresponding to the subscriber that indicates an address of the home component, the home component is to:
check the data attribute; and
in response to an absent data attribute, updating the data attribute, within the profile of the subscriber, the address of the home component of the subscriber.

8. The system of claim 6 wherein the home component is further to:
attach and authenticate the subscriber to the network prior to registration.

9. The system of claim 6 wherein the home component includes a home subscriber server (HSS).

10. The system of claim 6 wherein the other components are to:
receive the populated data attribute; and
store the data attribute as a subset of a profile data.

11. A non-transitory machine-readable storage medium comprising instructions that when executed by a processing resource cause a computing device to:
register a subscriber at a home component within a network for gaining access to the network;
based on the registration, populate a profile corresponding to the subscriber with a data attribute indicating an address of the home component;
transmit a subset of the populated profile to other components within the network such that the other components are capable of redirecting, to the home component, a message configured for delivery to the subscriber; and
maintain a full version of the populated profile;
attach the subscriber to the network;
wherein populating the profile corresponding to the subscriber with a data attribute indicating an address of the home component comprises:
in response to an absent data attribute, updating the data attribute, within the profile of the subscriber, indicating the home component of the subscriber.

12. The non-transitory machine-readable storage medium of claim 11 wherein to register the subscriber within the network comprises instructions that when executed by the processing resource causes the computing device to:
authenticate the subscriber prior to registration.

13. The non-transitory machine-readable storage medium of claim 11 wherein to transmit the populated profile to other components within the network comprises instructions that when executed by the processing resource cause the computing device to:
transmit an address of the home component to the other components.

14. The non-transitory machine-readable storage medium of claim 11 wherein based on the registration, the computing device is to populate the profile corresponding to the subscriber with the data attribute indicating the computing device as a home component to the subscriber comprises instructions that when executed by the processing resource causes the computing device to:
in response to an absent data attribute within the profile, populate the data attribute with the computing device as the home component.

15. The non-transitory machine-readable storage medium of claim 11 wherein based on the registration, the computing device is to populate the profile corresponding to the subscriber with the data attribute indicating the computing device as a home component to the subscriber comprises instructions that when executed by the processing resource causes the computing device to:
in response to a previously populated data attribute within the profile, update the data attribute with the computing device as the home component.

16. The non-transitory machine-readable storage medium of claim 11 wherein the home component includes a home subscriber server (HSS) enabled with a home location register (HLR) functionality to register the subscriber within the network.

* * * * *